United States Patent [19]
Tretter

[11] Patent Number: 5,901,253
[45] Date of Patent: May 4, 1999

[54] IMAGE PROCESSING SYSTEM WITH IMAGE CROPPING AND SKEW CORRECTION

[75] Inventor: Daniel R. Tretter, Mountain View, Calif.

[73] Assignee: Hewlett-Packard Company, Palo Alto, Calif.

[21] Appl. No.: 08/628,044

[22] Filed: Apr. 4, 1996

[51] Int. Cl.[6] .............................. G06K 9/32; G06K 9/36; H04N 1/46; H04N 1/387

[52] U.S. Cl. .......................... 382/289; 382/290; 382/291; 382/292; 382/294; 382/296; 358/452; 358/537

[58] Field of Search .................................. 382/289, 290, 382/291, 292, 294, 296; 358/452, 455, 537

[56] References Cited

U.S. PATENT DOCUMENTS

| | | | |
|---|---|---|---|
| 4,432,009 | 2/1984 | Reitmeier et al. | 348/580 |
| 4,533,959 | 8/1985 | Sakurai | 358/452 |
| 4,723,297 | 2/1988 | Postl | 382/289 |
| 4,802,229 | 1/1989 | Yamada | 382/289 |
| 4,823,395 | 4/1989 | Chikauchi | 382/296 |
| 4,876,730 | 10/1989 | Britt | 382/219 |
| 4,930,088 | 5/1990 | Horiguchi | 382/296 |
| 4,941,189 | 7/1990 | Britt | 382/290 |
| 4,953,230 | 8/1990 | Kurose | 382/296 |
| 5,093,653 | 3/1992 | Ikehira | 345/126 |
| 5,181,260 | 1/1993 | Kurosu et al. | 382/289 |
| 5,187,753 | 2/1993 | Bloomberg et al. | 382/289 |
| 5,189,711 | 2/1993 | Weiss et al. | 382/25 |
| 5,233,168 | 8/1993 | Kulik | 382/296 |
| 5,241,626 | 8/1993 | Taoda | 382/296 |
| 5,289,297 | 2/1994 | Bollman et al. | 358/537 |
| 5,355,420 | 10/1994 | Bloomberg et al. | 382/155 |
| 5,452,374 | 9/1995 | Cullen et al. | 382/293 |
| 5,517,587 | 5/1996 | Baker et al. | 382/296 |
| 5,528,387 | 6/1996 | Kelley et al. | 358/488 |

FOREIGN PATENT DOCUMENTS

| | | | |
|---|---|---|---|
| 0434415A2 | 6/1991 | European Pat. Off. | G06F 15/70 |
| 0469794A2 | 2/1992 | European Pat. Off. | H04N 1/387 |
| 0703696A2 | 2/1996 | European Pat. Off. | H04N 1/387 |

OTHER PUBLICATIONS

Jiang Liu, et al., "An Efficient Method For The Skew Normalization Of A Document", IEEE, Jul. 1992, pp. 122–125.

Yasuaki Nakano, et al., "An Algorithm For The Skew Normalization Of Document Image", IEEE, May 1990, pp. 8–13.

Stuart C. Hinds, et al., "A Document Skew Detection Method Using Run–Length Encoding And The Hough Transform", IEEE, May 1990, pp. 464–468.

Primary Examiner—Bipin Shalwala
Assistant Examiner—Daniel G. Mariam
Attorney, Agent, or Firm—Thomas X. Li

[57] ABSTRACT

An arrangement is described for determining the skew angle of a document image without requiring text or other skew detection information in the document or without human intervention. The arrangement accomplishes this by determining an edge of the document image within a scan image and uses that edge to determine the skew angle of the document image. The edge can be determined by locating the first or last document image pixel of each scan line of pixels in the scan image that belongs to the document image. This is accomplished by comparing each pixel of each scan line of pixels with a predetermined scan line of background pixels. The skew angle of the document image is then determined by computing the slope of the detected edge in the scan image. An arrangement of determining the boundary of the document image is also described. The arrangement does this by locating (1) a first document image pixel and a last document image pixel for the first scan line of the document image in the scan image, (2) a first document image pixel and a last document image pixel for the last scan line of the document image in the scan image, (3) a leftmost document image pixel of the document image in the scan image, and (4) a rightmost document image pixel of the document image in the scan image.

19 Claims, 13 Drawing Sheets

IMAGE PROCESSING SYSTEM WITH IMAGE CROPPING AND SKEW CORRECTION

BACKGROUND OF THE INVENTION

1. Field of the Invention

The present invention pertains to image processing systems. More particularly, this invention relates to an image processing system with (1) skew correction that does not require human intervention or the presence of text or skew detection information on the original document, and (2) image cropping that is done regardless of the shape of the image.

2. Description of the Related Art

It has been known that when a document (i.e., the original physical object, such as photo or text document) is scanned by a scanner, a digital image of the original document is typically generated. The digital image of the original document is, however, often found to be skewed (rotated) inside the entire scan image (i.e., inside the entire digital image obtained from the scanner). As is known, the scan image typically includes the image of the document as well as background information. A skew or inclination of the document image within the scan image is particularly likely to occur when the scanner uses an automatic document feed mechanism to feed the original document for scanning. In addition, when the size of the original document is relatively small in comparison to the scan region of the scanner, the scan image may contain considerable amount of background information. FIG. 1 illustrates a scan image 10 which exhibits these problems.

As can be seen from FIG. 1, the scan image 10 contains a document image 11 of an original document. The remaining area of the scan image 10 is background 12 which typically has a predetermined pixel pattern. The document image 11 is skewed inside the scan image 10 and the background 12 is a considerable fraction of the scan image 10. When the scan image 10 is displayed on a display or printed by a printer, the document image 11 typically has a relatively unpleasant and poor visual quality. In addition, the skewed image may also cause errors when the image data is further processed by other software programs.

Prior techniques have been developed to try to detect and correct the skew problem. For example, U.S. Pat. No. 4,941,189, entitled OPTICAL CHARACTER READER WITH SKEW RECOGNITION and issued on Jul. 10,1990, describes a prior art skew correction technique that searches for text characters along a scan line. As another example, U.S. Pat. No. 5,452,374, entitled SKEW DETECTION AND CORRECTION OF A DOCUMENT IMAGE REPRESENTATION and as issued on Sep. 19, 1995, describes another prior technique that segments the scan image into text and non-text regions and then determines the skew information based on the resulting segmentation.

These prior techniques, however, require the original document to contain at least some text. The prior techniques then rely on the detection of one or more lines of the text in the document. With the advent of inexpensive photo scanners and multimedia personal computers, scanners are nowadays used to scan not only text documents, but photographs and other image documents as well. The photographs, however, typically do not contain any text data. This thus causes the prior skew detection and correction techniques to be inapplicable to the scanned photo images. In addition, because photographs can have a variety of sizes and shapes, it is typically difficult to trim the background information from the scanned image of a photograph.

Several prior art techniques have been proposed that detect the skew information of a scanned image without requiring the presence of text in the scanned document. One such prior art technique is described in U.S. Pat. No. 5,093,653, entitled IMAGE PROCESSING SYSTEM HAVING SKEW CORRECTION MEANS, and issued on Mar. 3, 1992. Another such prior art technique is described in U.S. Pat. No. 4,533,959, entitled PICTURE PROCESSING APPARATUS, and issued on Aug. 6, 1985. However, these prior art techniques require either human intervention (e.g., U.S. Pat. No. 5,093,653) or special skew detection marks on the original document (e.g., U.S. Pat. No. 4,533,959).

SUMMARY OF THE INVENTION

One of the features of the present invention is to provide skew correction for a scanned image without requiring the presence of text or special skew detection information on the original document.

Another feature of the present invention is to provide skew correction for a scanned image without requiring human intervention.

A further feature of the present invention is to provide image cropping for a scanned image regardless of the size and/or shape of the original.

A still further feature of the present invention is to provide skew correction and image cropping for a scanned image in a cost effective manner.

Described below is an arrangement for determining the skew angle of a document image without requiring (1) text or other skew detection information in the document and (2) human intervention. The arrangement accomplishes this by determining an edge of the document image within a scan image and uses that edge to determine the skew angle of the document image. The edge can be determined by locating the first or last document image pixel of each scan line of pixels in the scan image that belongs to the document image (i.e., the edge pixel of the document image along that scan line). This is accomplished by comparing each scan line of pixels with a predetermined scan line of background pixels. The skew angle of the document image is then determined by computing the slope of the detected edge in the scan image.

In addition, an arrangement of determining the boundary of the document image is also described. The arrangement does this by locating (1) a first document image pixel and a last document image pixel for a first scan line of the document image in the scan image, (2) a first document image pixel and a last document image pixel of a last scan line of the document image in the scan image, (3) a leftmost document image pixel of the document image in the scan image, and (4) a rightmost document image pixel of the document image in the scan image.

BRIEF DESCRIPTION OF THE DRAWINGS

The present invention is illustrated by way of example and not by way of limitation in the figures of the accompanying drawings, in which like references indicate similar elements, and in which.

DETAILED DESCRIPTION OF THE INVENTION

Figure 1:
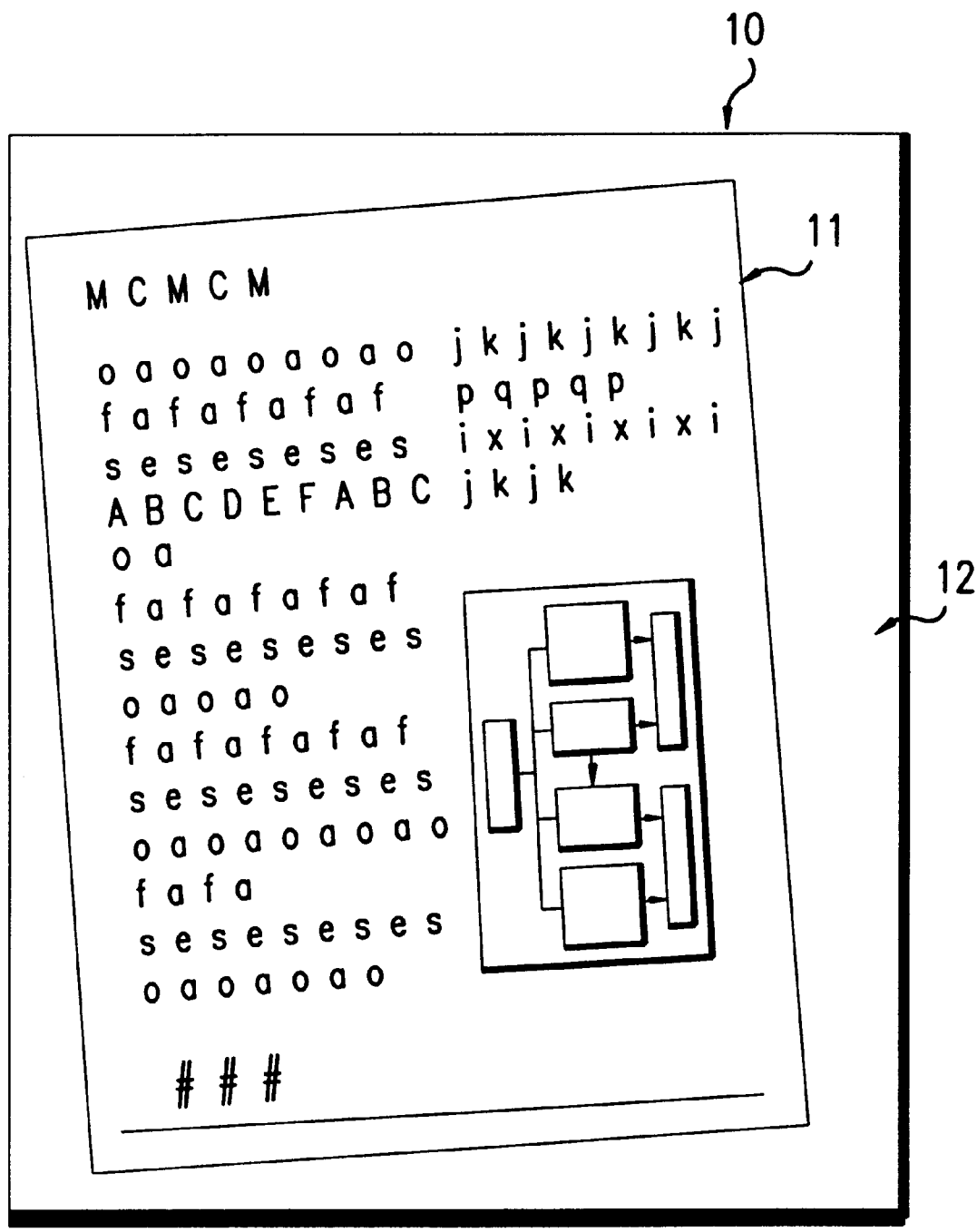
FIG. 1 shows a skewed image of a document in a scan.
Figure 2:
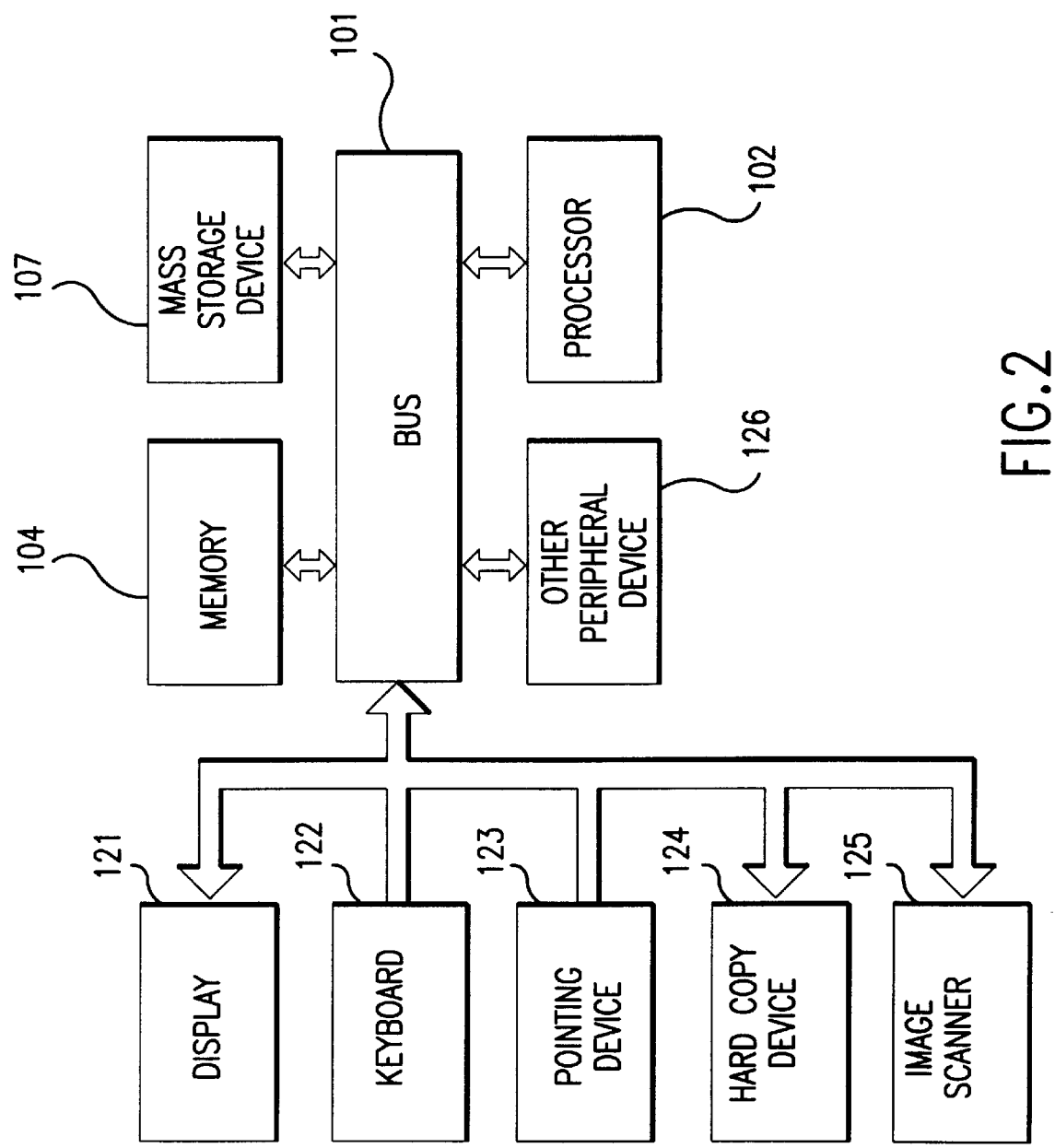
FIG. 2 shows a computer system that implements an image processing system.

FIG. 2 illustrates a computer system 100 that implements an image processing system 200 (shown in FIGS. 3 and 4) within which an image cropping and skew detection program 202 (shown in FIGS. 3 and 4) in accordance with one embodiment of the present invention may be implemented. Although FIG. 2 shows some of the basic components of the computer system 100, it is neither meant to be limiting nor to exclude other components or combinations of components in the system. The image processing system 200 and the skew detection and image cropping program 202 in accordance with the present invention will be described in more detail below, also in conjunction with FIGS. 3 through 12.

In one embodiment, the computer system 100 can be a personal computer having a scanner, a notebook computer having a scanner, a palmtop computer having a scanner, a workstation having a scanner, or a mainframe computer having a scanner. In another embodiment, the computer system 100 can be a scan system that also has some or all of the components of a computer system.

As can be seen from FIG. 2, the computer system 100 includes a bus 101 for transferring data and other information. The computer system 100 also includes a processor 102 coupled to the bus 101 for processing data and instructions. The processor 102 can be any known and commercially available processor or microprocessor. A memory 104 is also provided in the computer system 100. The memory 104 is connected to the bus 101 and typically stores information and instructions to be executed by the processor 102. The memory 104 may also include a frame buffer (not shown in FIG. 2) that stores a frame of bitmap image to be displayed on a display 121 of the computer system 100.

The memory 104 can be implemented by various types of memories. For example, the memory 104 can be implemented by a RAM (Random Access Memory) and/or a nonvolatile memory. In addition, the memory 104 can be implemented by a combination of a RAM, a ROM (Read Only Memory), and/or an electrically erasable and programmable nonvolatile memory.

The computer system 100 also includes a mass storage device 107 connected to the bus 101. The mass storage device 107 stores data and other information. In addition, the mass storage device 107 stores system and application programs. The programs are executed by the processor 102 and need to be downloaded to the memory 104 before being executed by the processor 102.

The display 121 is coupled to the bus 101 for displaying information to a user of the computer system 100. A keyboard or keypad input device 122 is also provided that is connected to the bus 101. An additional input device of the computer system 100 is a pointing device 123. The pointing device 123 can be also referred to as a cursor control device 123, such as a mouse, a trackball, a trackpad, or a cursor direction key. The cursor control device 123 is also connected to the bus 101 for communicating direction information and command selections to the processor 102, and for controlling cursor movement on the display 121. Another device which may also be included in the computer system 100 is a hard copy device 124. The hard copy device 124 is used in the computer system 100 to print text and/or image information on a medium such as paper, film, or similar types of media.

In addition, the computer system 100 includes an image scanner 125. The image scanner 125 is used to convert an original document (i.e., the original physical document, such as photo or text document) into a digitized image which can be further processed by the computer system 100. In one embodiment, the image scanner 125 is a fax machine-type image scanner that has a scan region of one scan line wide. The length of the scan region is the width of the scan line. In this case, the scan head of the image scanner 125 simultaneously images the entire scan line. A document feed mechanism is provided to advance the original document after each scan. In another embodiment, the image scanner 125 is a copier-type image scanner that has a relatively large scan region. For this type of scanner, the original document is placed against the scan window of the scanner and the scan head of the scanner moves in one direction after each scan.

The computer system 100 also includes other peripheral devices 126. These other devices 126 may include a digital signal processor, a MODEM (modulation/demodulation), and/or a CD-ROM drive. In addition, the computer system 100 may function without some of the above described components. For example, the computer system 100 may function without the hard copy device 124.

Figure 3:
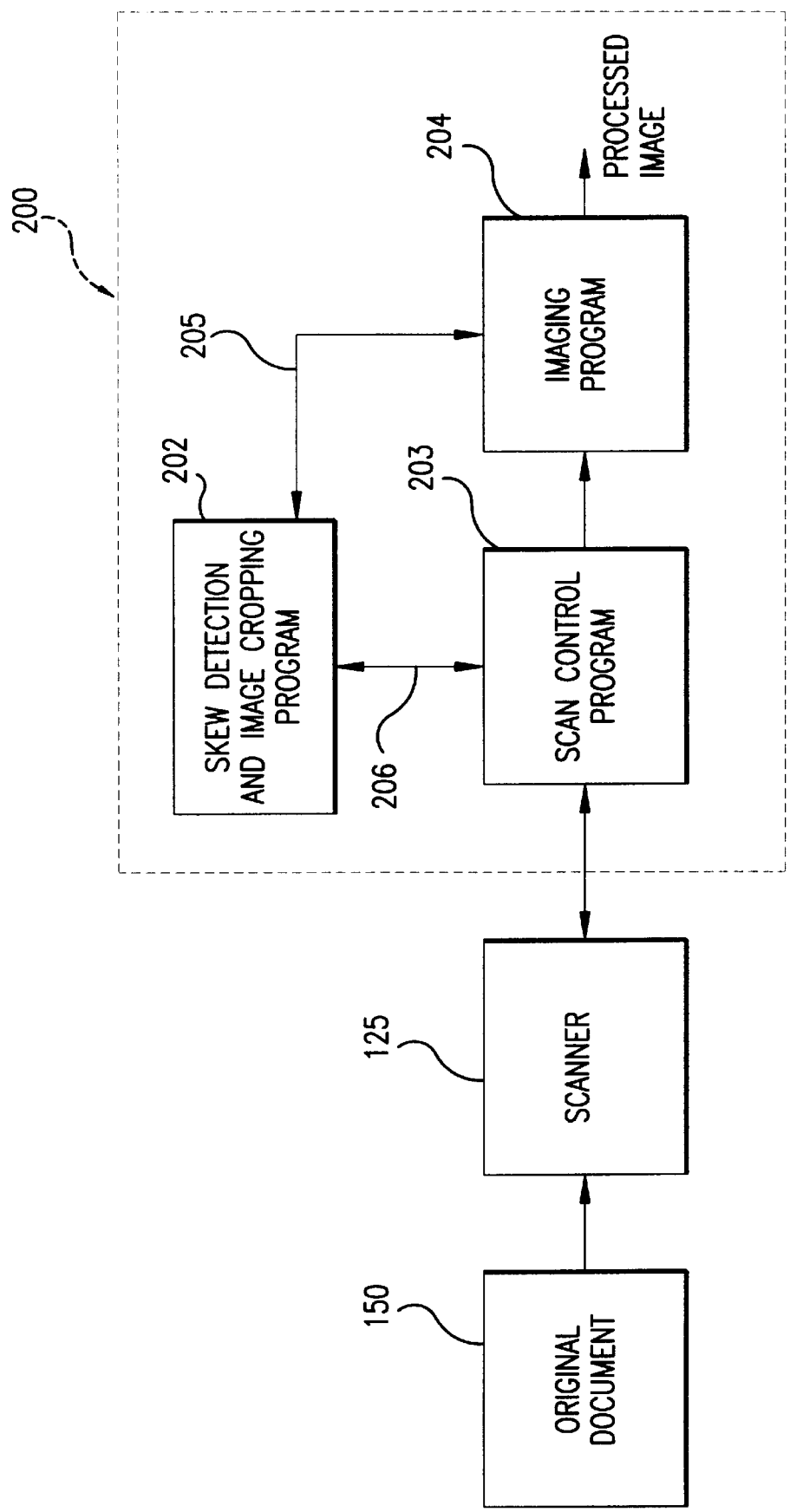
FIG. 3 shows the image processing system implemented by the computer system of FIG. 2, wherein the image processing system includes a skew correction and image cropping program in accordance with one embodiment of the present invention.
Figure 4:
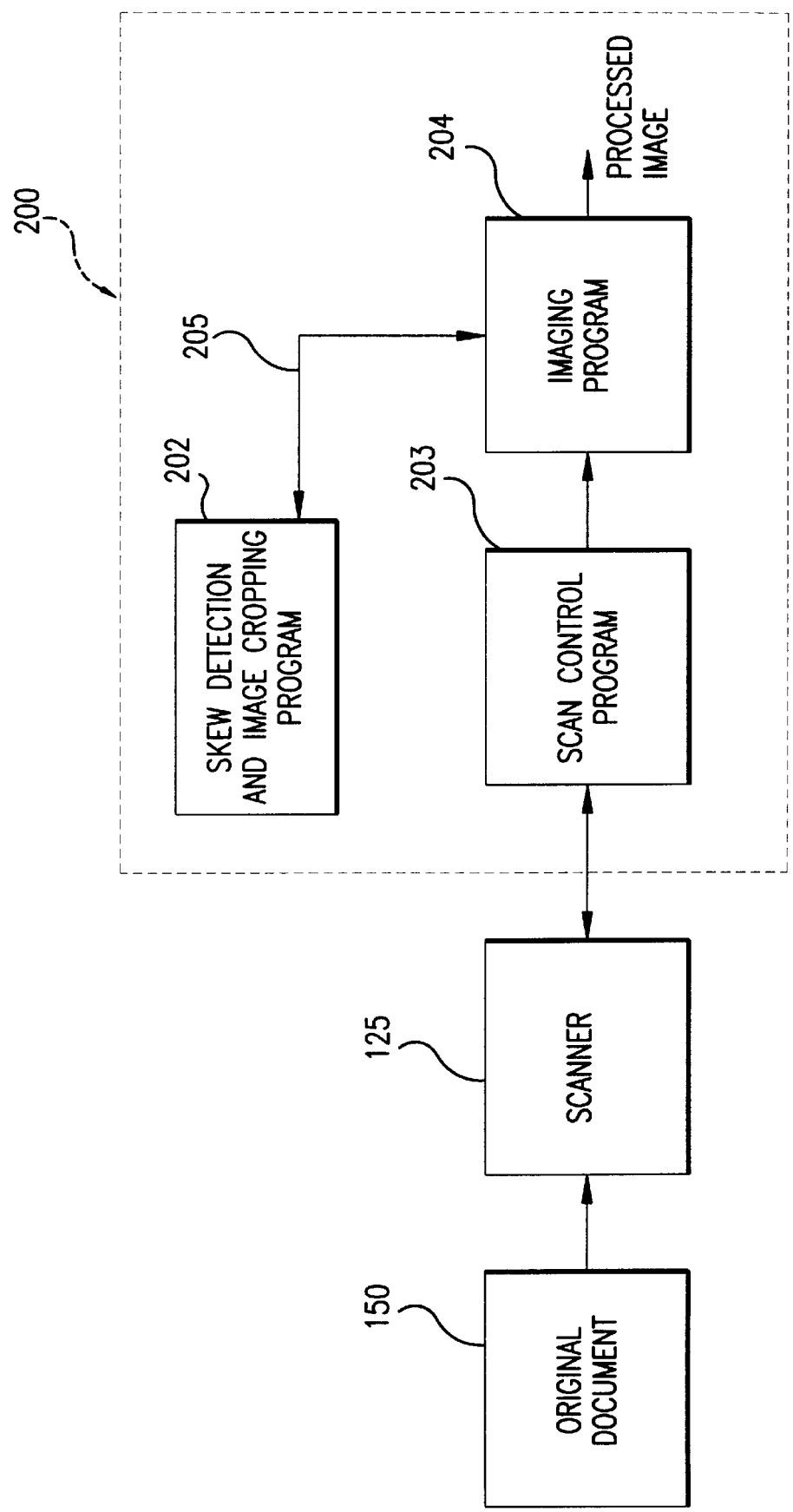
FIG. 4 illustrates a different configuration of the skew correction and image cropping program in the image processing system of FIG. 3.

As described above, the computer system 100 includes the image processing system 200 (shown in FIGS. 3 and 4) which includes the skew detection and image cropping program 202 of the present invention (also shown in FIGS. 3 and 4). In one embodiment, the image processing system 200 is implemented as a series of software programs that are run by the processor 102, which interacts with scan data received from the scanner 125. It will, however, be appreciated that the image processing system 200 can also be implemented in discrete hardware or firmware.

Similarly, the skew detection and image cropping program 202 alone can be implemented either as a software program run by the processor 102 or in the form of discrete hardware or firmware within the image processing system 200. The image processing system 200, as well as the skew detection and image cropping program 202, will be described in more detail below, in the form of software programs.

As can be seen from FIG. 3, the image processing system 200 includes a scan control program 203 and an imaging program 204, in addition to the skew detection and image cropping program 202. All of the programs 202 through 204 are typically stored in the mass storage device 107 of the computer system 100 (FIG. 2). These programs are loaded into the memory 104 from the mass storage device 107 before they are executed by the processor 102.

The scan control program 203 interfaces with the scanner 125 and the imaging program 204. The function of scan control program 203 is to control the scanning operation of the scanner 125 and to receive the scan image of an original document 150 from the scanner 125. As is known, the scan image of a document typically includes the digital image of the document (i.e., the document image) and some background image. The scan control program 203 is typically a scanner driver program for the scanner 125. In one embodiment, the scan control program 203 is the HP DeskScan application program manufactured and sold by Hewlett-Packard Company, Palo Alto, Calif. Alternatively, the scan control program 203 can be any known scanner driver program.

Figure 5:
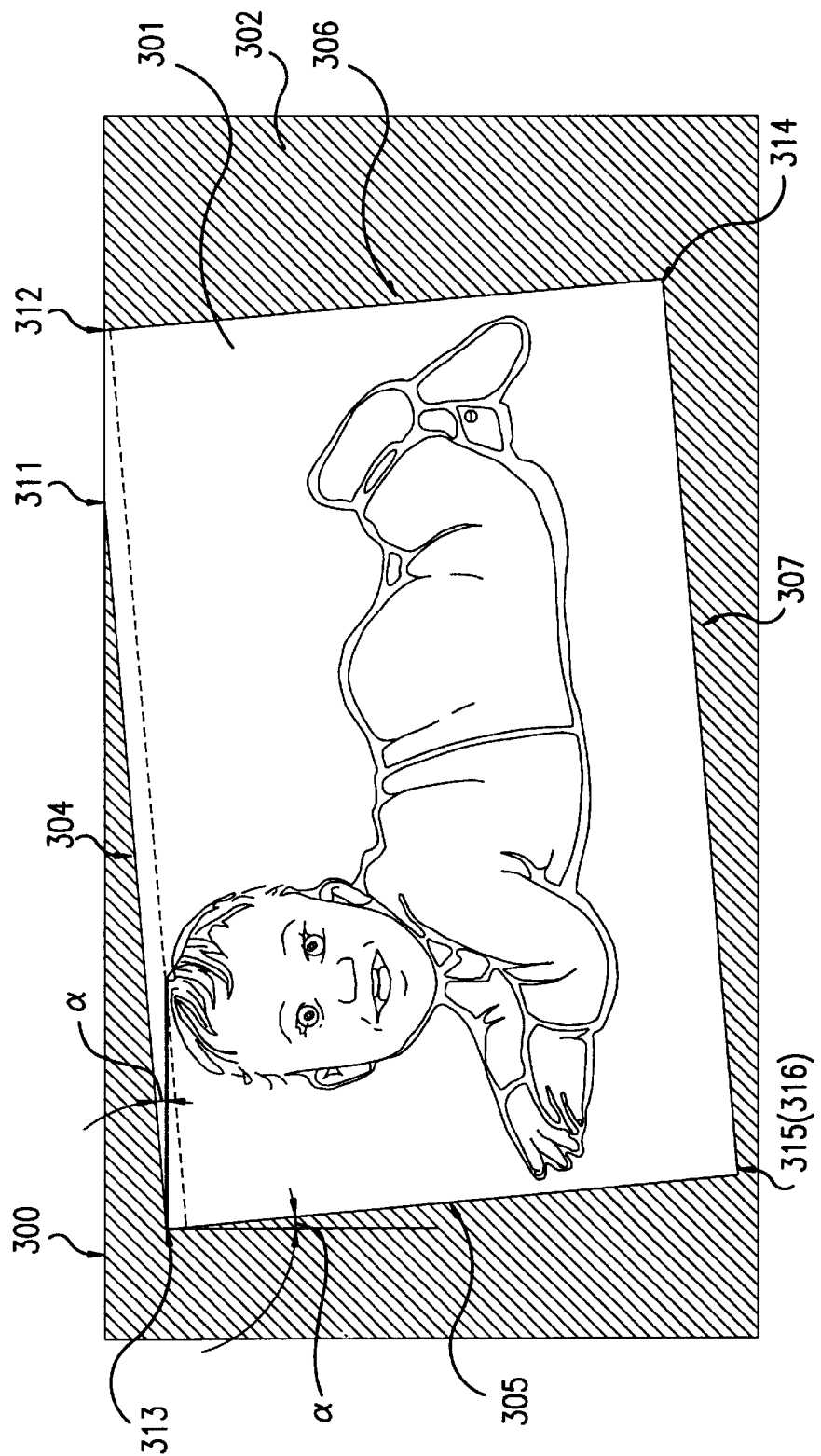
FIG. 5 shows a document image generated by the image processing system of FIG. 3 or 4 before being processed by the skew correction and image cropping arrangement of FIGS. 3 and 4.
Figure 7:
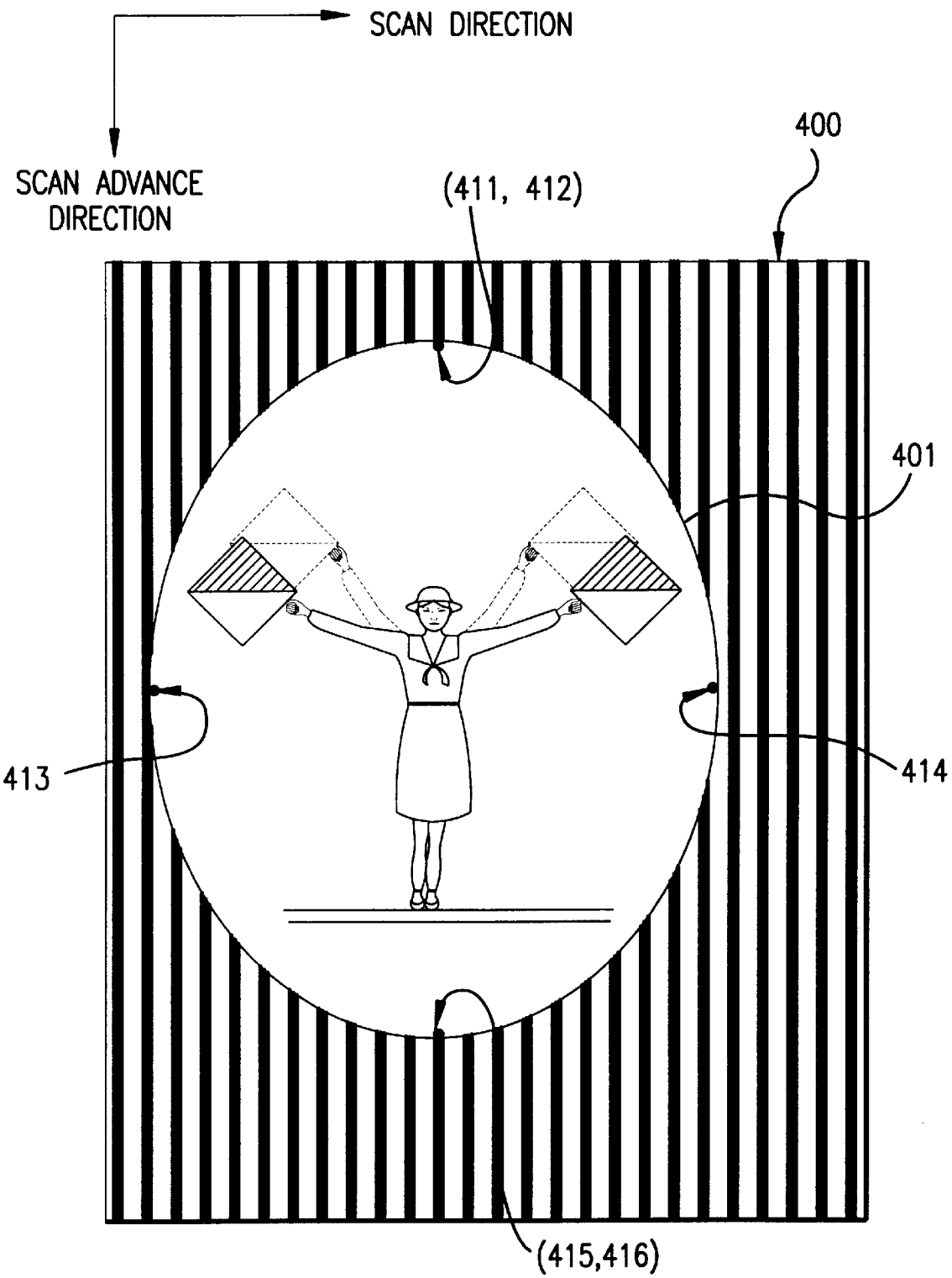
FIG. 7 shows another document image generated by the image processing system of FIG. 3 or 4 before being processed by the skew correction and image cropping program of FIGS. 3 and 4.

As described above, the scan control program 203 controls the scanner 125 to scan the document 150. The original document 150 can be of different shapes and sizes. For example, the document 150 can be of a rectangular shape, a polygon shape, or a circular or oval shape. FIG. 5 shows one example of a scan image 300 of the document 150 obtained by the scan control program 203. As can be seen from FIG. 5, the document image 301 of document 150 is skewed inside the scan image 300 and has a skew angle α. As can be seen from the scan image 300, the scanned document 150 has a rectangular shape. FIG. 7 shows another scan image 400 of the document 150 obtained by the scan control program 203 when the document 150 has an oval shape. Both FIGS. 5 and 7 show considerable background within scan images 300 and 400.

As shown in FIG. 3, the imaging program 204 is used in the image processing system 200 to process the scan image (e.g., the scan image 300 or 400 of FIG. 5 or 7) of the original document 150 received from the scan control program 203. The imaging program 204 typically processes the scan image of the original document 150 so that the scan image can be displayed on the display 121 or printed by the hard copy device 124. The processing functions of the imaging program 204 typically include resampling and interpolation of the scan image. The imaging program 204 typically includes a device-specific image driver program. For example, the imaging program 204 can include a known display driver program or a known printer driver program.

In one embodiment, the imaging program 204 is the EasyPhoto imaging program manufactured and sold by Storm Technology, Inc., Mountain View, Calif. In another embodiment, the imaging program 204 is the Photoshop imaging program manufactured and sold by Adobe Systems, Inc., Mountain View, Calif. Alternatively, the imaging program 204 can be any other known image processing application.

As can be seen from FIG. 3, the skew detection and image cropping program 202 of the image processing system 200 interfaces with the scan control program 203 and the imaging program 204. The skew detection and image cropping program 202 receives data of the scan image of the document 150 from the scan control program 203. The skew detection and image cropping program 202 then detects the skew angle and boundary of the document image of the document 150 within the scan image such that the skew of the document image can be corrected (i.e., deskewed) and much or all of the background image within the scan image can be eliminated.

The skew detection and image cropping program 202 detects the skew angle of the document image (e.g., the document image 301 of FIG. 5) inside the scan image (e.g., the scan image 300 of FIG. 5) by first detecting an edge of the document image and then determining the slope of the edge. This allows the skew angle detection of the document image to be done without requiring the presence of text or special skew detection marks on the document image. This also allows the imaging program 204 to correct the skew of the document image without human intervention.

In addition, the skew detection and image cropping program 202 detects the boundary of the document image (e.g., the document image 301 of FIG. 5) by locating a first and a last document image pixel for the first scan line of the document image, a first and a last document image pixel for the last scan line of the document image, a leftmost document image pixel of the document image, and a rightmost document image pixel of the document image within the scan image. The positioned information of these six pixels are then used to compute the extent (i.e., boundary) of the document image in the scan image after skew correction. This information is then provided to the imaging program 204, allowing the imaging program 204 to trim or crop the scan image to obtain the document image without much or all of the background information.

The skew detection and image cropping program 202 detects the skew angle and boundary information of a document image within a scan image by locating the first and last pixels of each scan line of the document image inside the scan image. The skew detection and image cropping program 202 does this by comparing each scan line of pixels in the scan image with a predetermined scan line of background pixels to locate the first and last document image pixels. This allows boundary edge segments of the document image to be developed. The skew detection and image cropping program 202 then determines the length of each edge segment of the document image and calculates the skew of the edge segment. If the skew detection and image cropping program 202 determines that an edge segment is not long enough, the program 202 does not calculate the skew of that edge segment. In addition, if the skew detection and image cropping program 202 determines that the document image has multiple skew angles (i.e., the skew of an edge segment in the document image is not equal to that of another edge segment of the document image), the program 202 determines that the document image has a non-rectangular shape. When this occurs, the skew detection and image cropping program 202 sets the skew angle of the document image to zero no matter whether the document image is skewed or not. In other words, if the skew detection and image cropping program 202 determines that the document image has a non-rectangular (e.g., circular, oval, or polygonal) shape, the program 202 does not detect the skew angle of the document image. Instead, the program 202 only provides the boundary information of the document image so that much or all of the background is trimmed or cropped away from the scan image.

Figure 8:
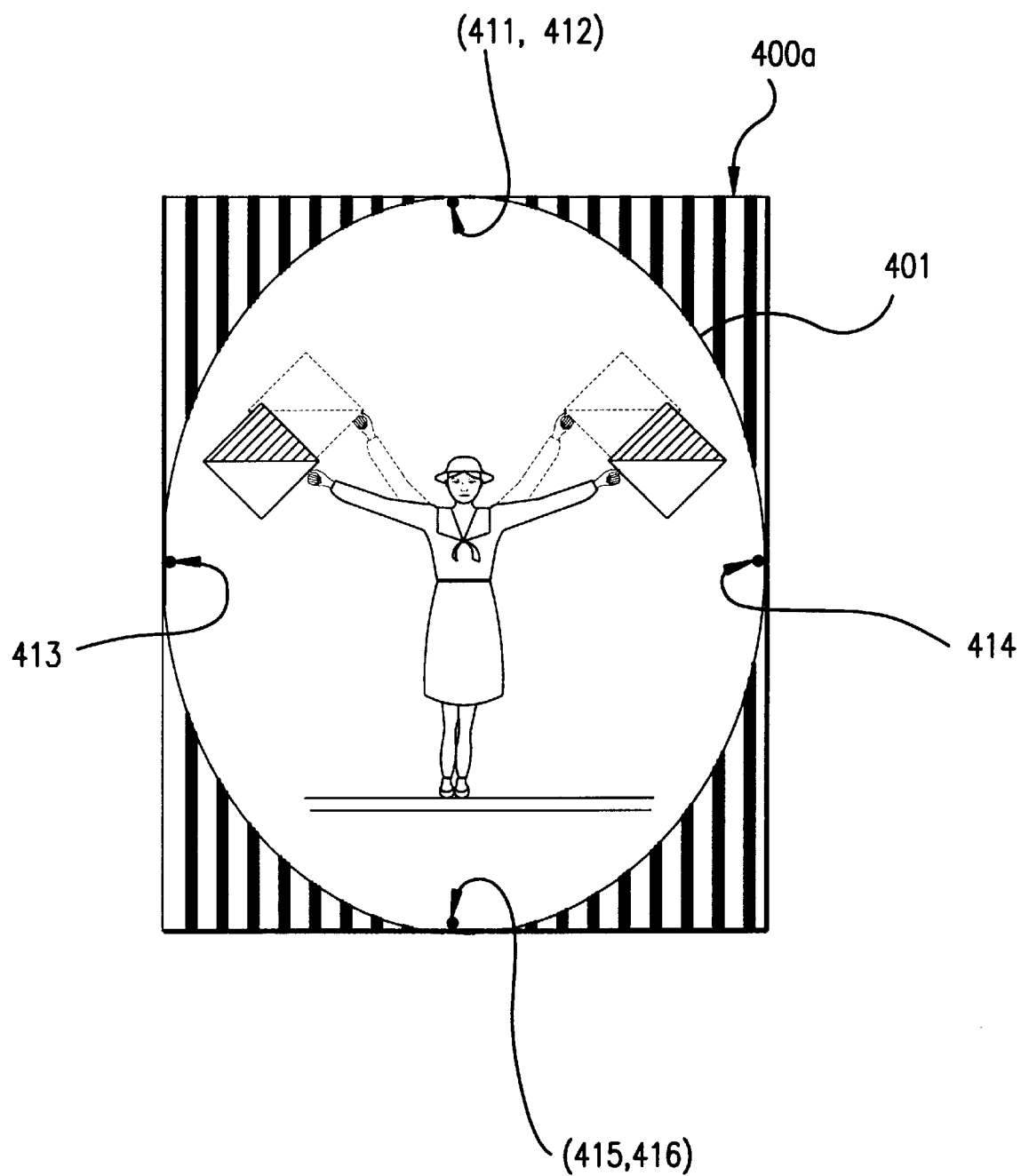
FIG. 8 shows the document image of FIG. 7 after being processed by the skew correction and image cropping program of FIGS. 3 and 4.

Moreover, when the skew detection and image cropping program 202 determines that the detected document image is not of a rectangular shape, the program 202 only defines the smallest rectangle that contains all of the six pixels and informs the imaging program 204 to take the entire interior of this rectangle as the cropped document image (see, for example, FIG. 8). In this case, not all background information is trimmed off. The operation of the skew correction and image cropping program 202 is now described in more detail below, also in conjunction with FIGS. 5–6 when the document 150 has a rectangular shape or FIGS. 7–8 when the document 150 has a non-rectangular shape.

Figure 6:
FIG. 6 shows the document image of FIG. 5 after being processed by the skew correction and image cropping program of FIGS. 3 and 4.

As can be seen from FIGS. 3 and 5–6, the skew detection and image cropping program 202 checks the scan image 300 to locate the first and last document image pixels of the first scan line of the document image 301. As can be seen from FIG. 5, the program 202 learns that the first scan line of the scan image 300 is the first scan line of the document image 301. The program 202 then locates the first document image pixel 311 and the last document image pixel 312 of the first scan line of the document image 301. As the skew detection and image cropping program 202 continues checking the first and last document image pixels of other scan lines of the document image 301, the edge segments 304 through 307 are developed. In addition, the leftmost document image pixel 313 and rightmost document image pixel 314 are located. The first and last document image pixels (i.e., 315 and 316) of the last scan line of the document image 301 are also located. As can be seen from FIG. 5, the first document image pixel 315 of the last scan line of the document image 301 overlaps the last document image pixel 316 of that scan line.

After the edge segments 304–307 of the document image 301 are developed, the skew detection and image cropping program 202 calculates the skew angle α which is then sent to the imaging program 204 (FIG. 3), along with cropping boundaries computed from the skew angle α and the pixels 311–316.

Figure 9A:
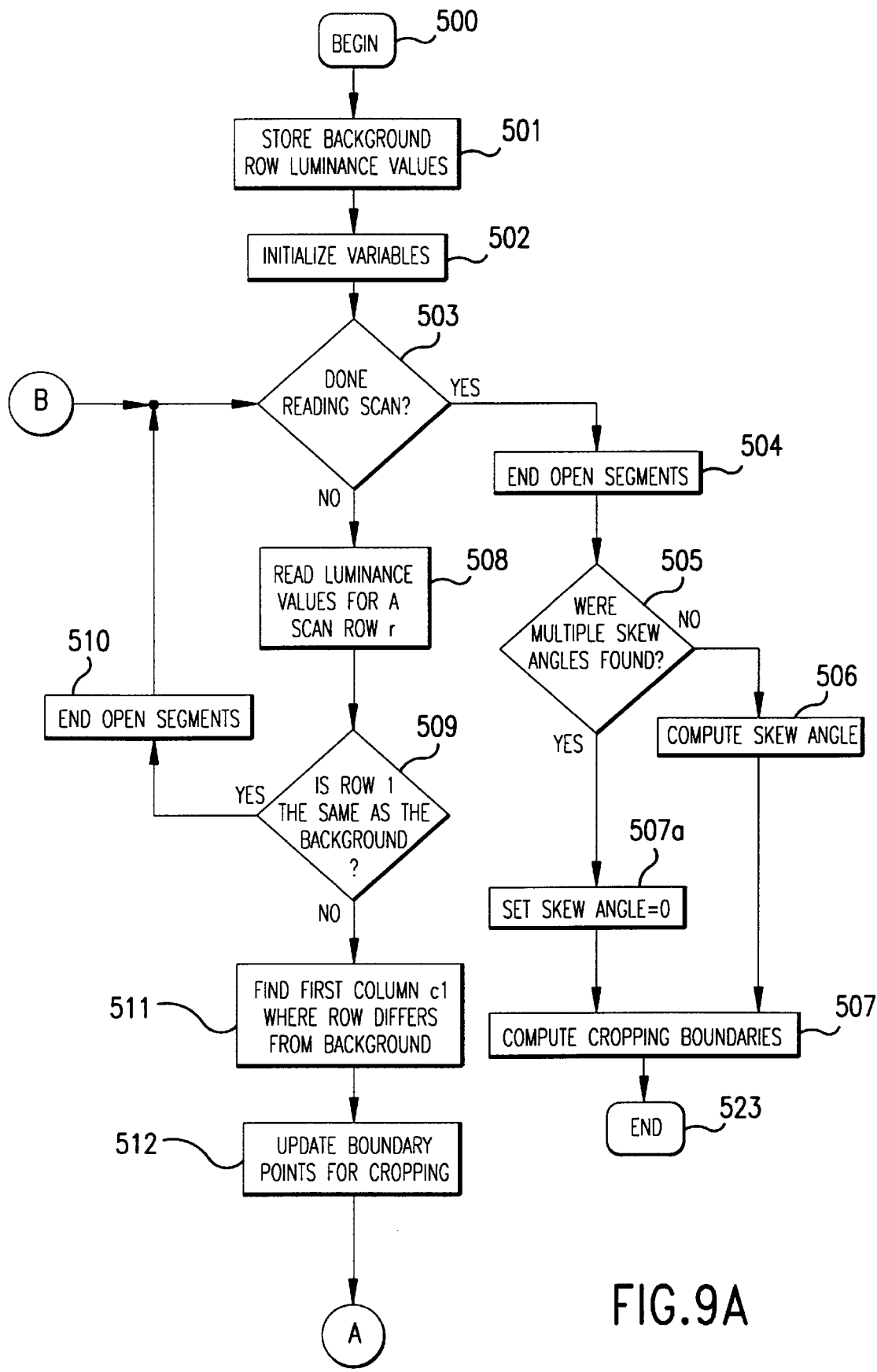
FIGS. 9A–9B and 10 show the flow chart diagrams of the skew correction and image cropping program of FIGS. 3 and 4.

As described above, the skew detection and image cropping program 202 of FIG. 3 also detects if the document image is of a rectangular shape when the program calculates the skew angle α of the document image. If the program 202 detects that the document image (e.g., the document image 401 of FIG. 7) is not of a rectangular shape, then the program 202 does not calculate the skew angle of the document image and sets the skew angle to zero. The skew detection and image cropping program 202 detects whether a document image is rectangular or not by determining if the document image has multiple skew angles. When this occurs, the document image has a non-rectangular shape (e.g., the polygonal shape). In addition, the program 202 also detects if the document image has a rectangular shape by detecting if the edge segments of the document image are longer than a predetermined length. Those edge segments shorter than the predetermined length are discarded, and no skew angle is computed for such segments. If all detected segments are discarded, the program 202 determines that the document image has a non-rectangular shape (e.g., oval or circular shape) and again does not calculate the skew angle of the document image. When this occurs, the program 202 will only locate those six boundary pixels of the document image. FIGS. 9A through 10 show in flow chart diagram forms the skew detection and image cropping program 202, which will be described in more detail below.

As can be seen from FIGS. 3 and 7–8, when the document 150 has a document image 401 that is of an oval shape, the program 202 of FIG. 3 detects multiple edges that are of different skew angles and/or shorter than the predetermined edge length. In one embodiment, the predetermined edge length contains approximately twenty five pixels. In alternative embodiments, the predetermined edge length can be longer or shorter than twenty five pixels.

When the program 202 detects that the document image 401 is not rectangular, the program 202 only locates the six boundary pixels (i.e., the first and last document image pixels 411 and 412 of the first scan line of the document image 401, the leftmost document image pixel 413, the rightmost document image pixel 414, and the first and last document image pixels 415 and 416 of the last scan line of the last scan line of the document image 401). As can be seen from FIG. 7, the first and last document image pixels 411 and 412 of the first scan line of the document image 401 overlap each other and the first and last document image pixels of the last scan line of the document image 401 overlap each other.

As can be seen in FIGS. 3 and 5–6, the imaging program 204 then corrects the skew of the document image 301 in accordance with the skew angle α received from the skew detection and image cropping program 202 and eliminates all of the background 302 in the scan image 300 in accordance with the six document image pixels 311 through 316. The imaging program 204 does this in a known way, which will not be described in more detail below. The processed document image 301a is shown in FIG. 6.

As can be seen from FIGS. 5 and 6, the processed document image 301a of FIG. 6 is identical to the unprocessed document image 301 of FIG. 5 except that no background information of the scan image 300 is displayed in FIG. 6. In addition, the processed document image 301a is not skewed. Moreover, the processed document image 301a of FIG. 6 does not have the cut-off edge. This is due to the fact that the imaging program 204 further trims the document image 301 of FIG. 5 based on the document image pixels 311–316.

When processing the document image 401 of FIG. 7, the skew detection and image cropping program 202 (FIG. 3) only sends the pixel information of the six boundary pixels 411 through 416 to imaging program 204 (FIG. 3). Based on these six pixels 411–416, the imaging program 204 creates a smallest rectangle 400a that contains all of these pixels and the document image 401. The imaging program 204 then trims away everything in the scan image 400 of FIG. 7 that is outside of the rectangle 400a to obtain the cropped document image 401.

As can be seen from FIG. 3, because the skew detection and image cropping program 202 interfaces with the scan control program 203, the skew detection and image cropping program 202 receives one scan line of pixels from the scan control program 203 as soon as the scan control program 203 controls the scanner 125 to finish scanning one such scan line. This causes the skew detection and image cropping program 202 to operate in parallel with the operation of the scan control program 203. As a result, the skew detection and image cropping program 202 can determine the skew angle and boundary information of the document image of the document 150 as soon as the scan control program 203 finishes scanning the document 150.

It is, however, appreciated that the skew detection and image cropping program 202 is not limited to the above described configuration. FIG. 4 shows another embodiment of the image processing system 200 in which the skew detection and image cropping program 202 only interfaces with the imaging program 204. This allows the skew detection and image cropping program 202 to detect the skew angle and boundary information of the document image of the document 150 after the entire document 150 has been scanned and its scan image has been sent to the imaging program 204 from the scan control program 203.

Figure 9B:
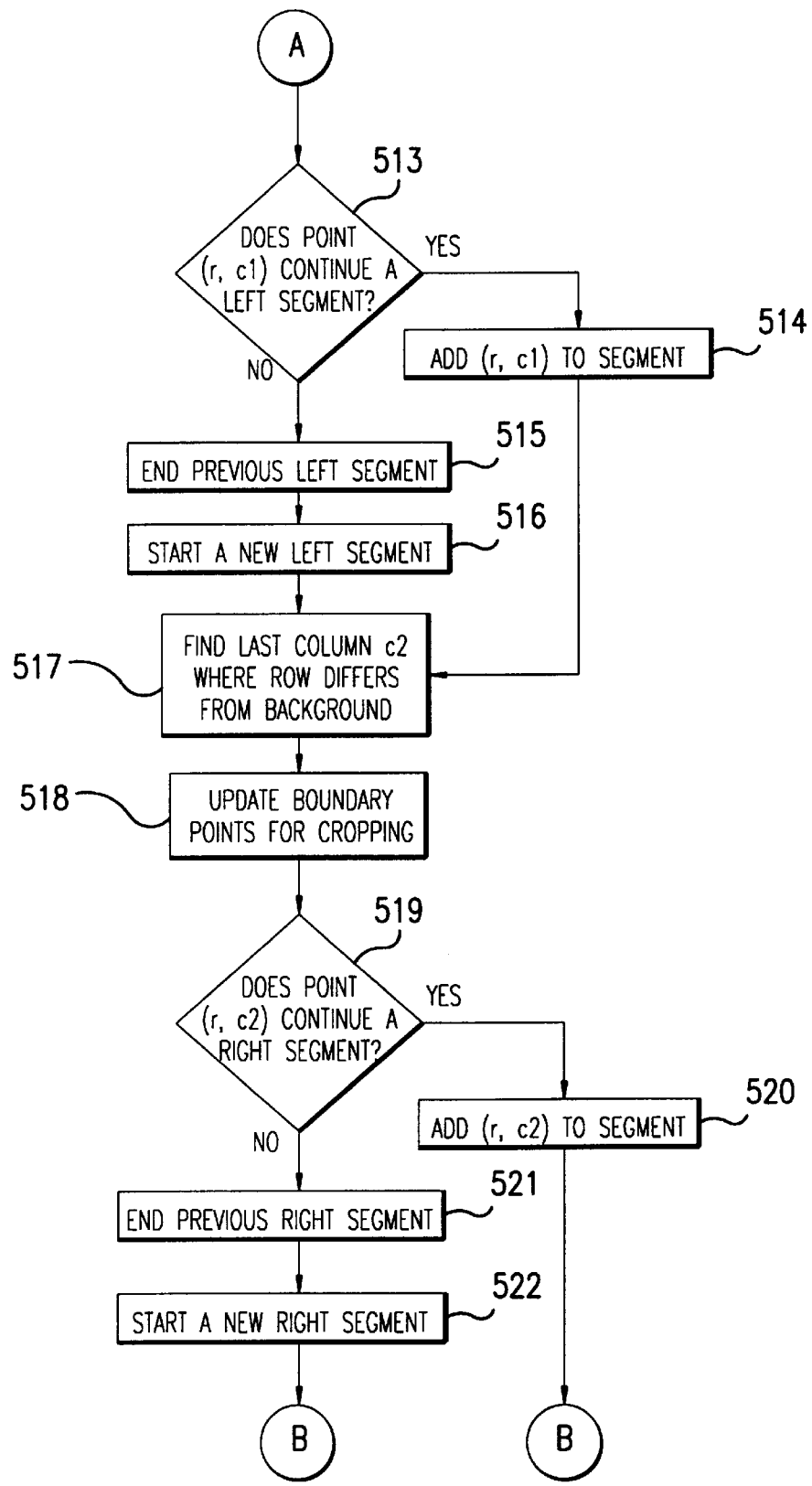
Figure 10:
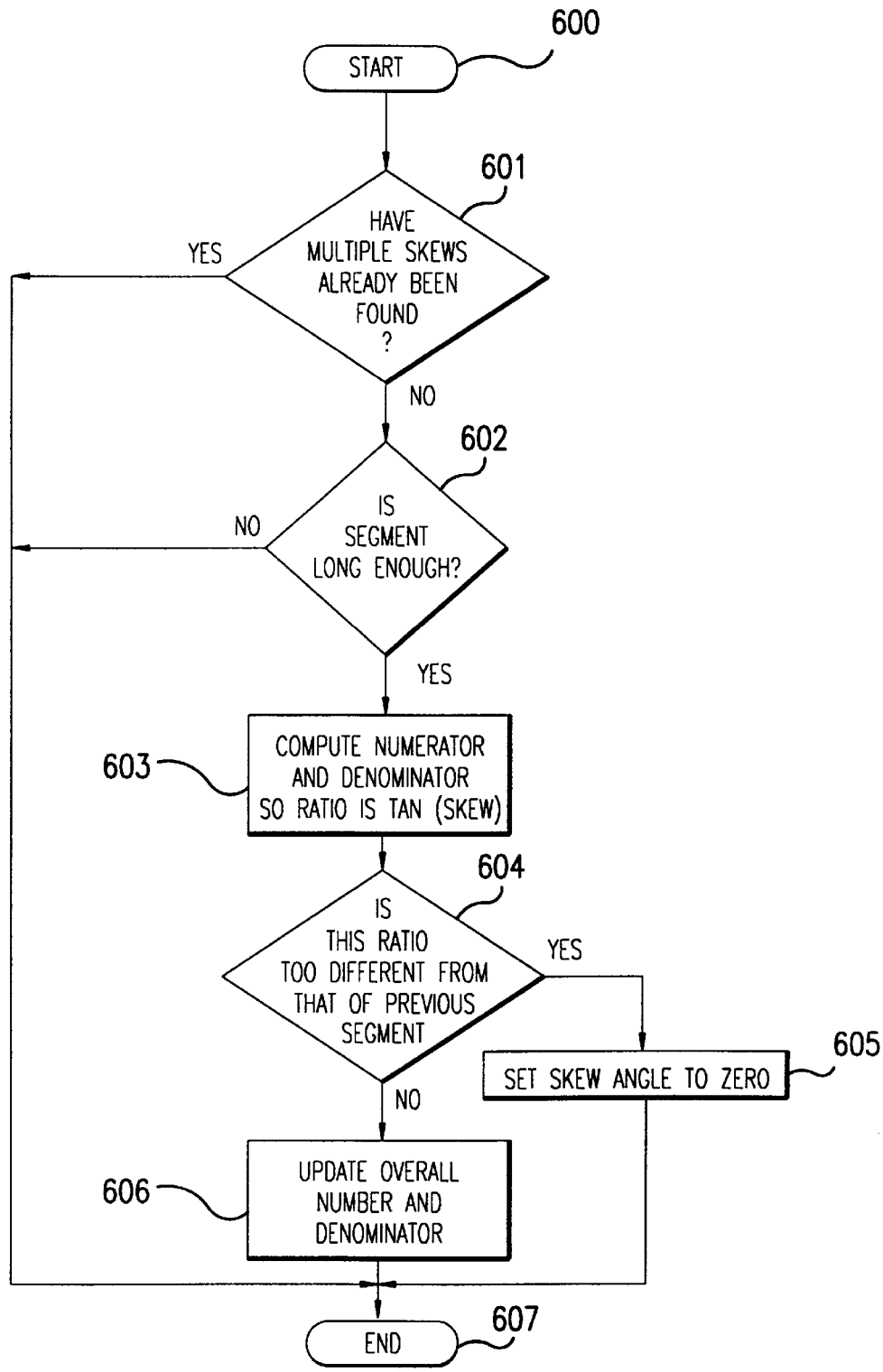
Figure 11:
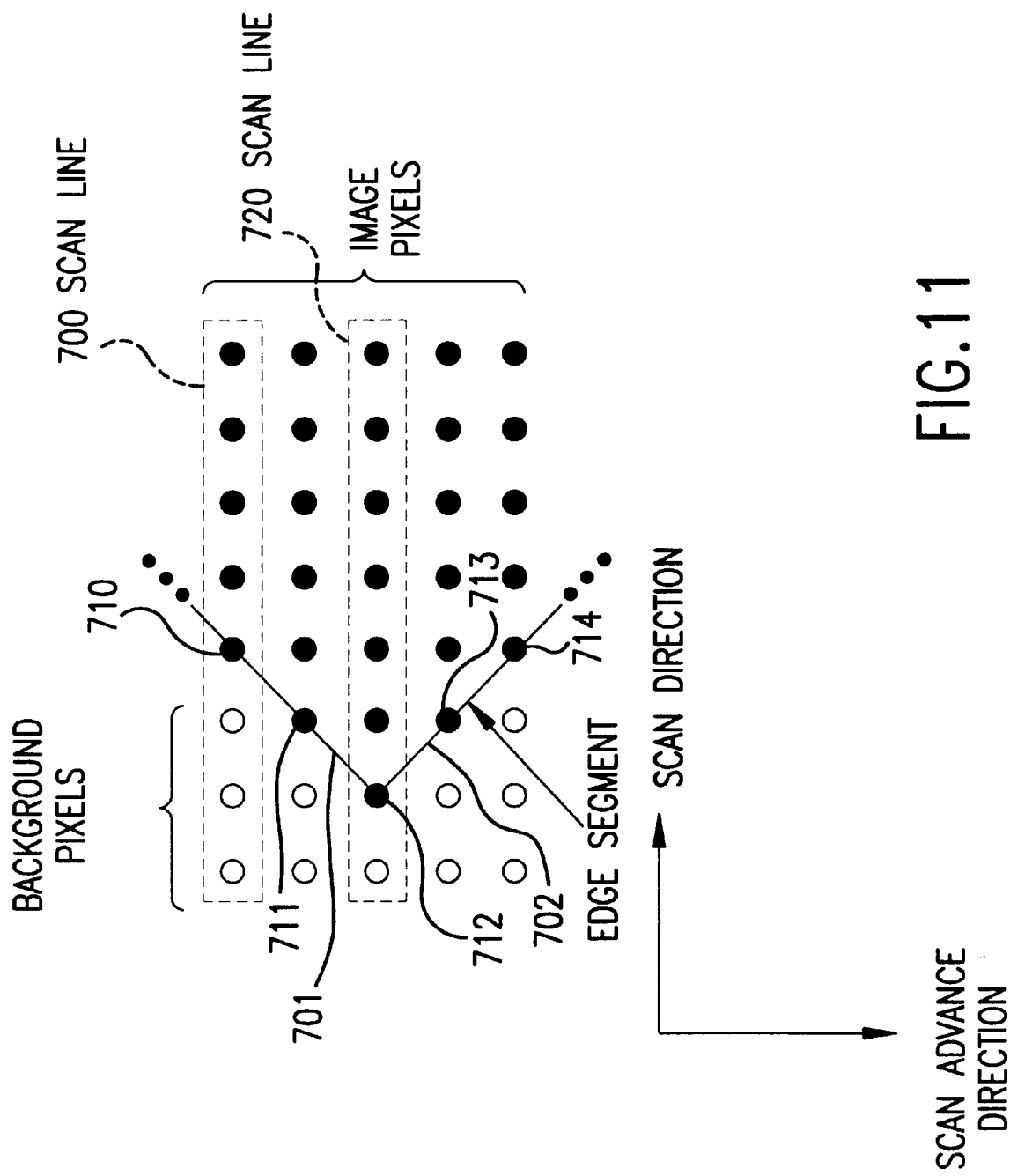
FIGS. 11 and 12 illustrate how the skew angle and boundary information of a document image is obtained by the skew correction and image cropping program of FIGS. 3 and 4 when the document image has rectangular and non-rectangular shapes.
Figure 12:
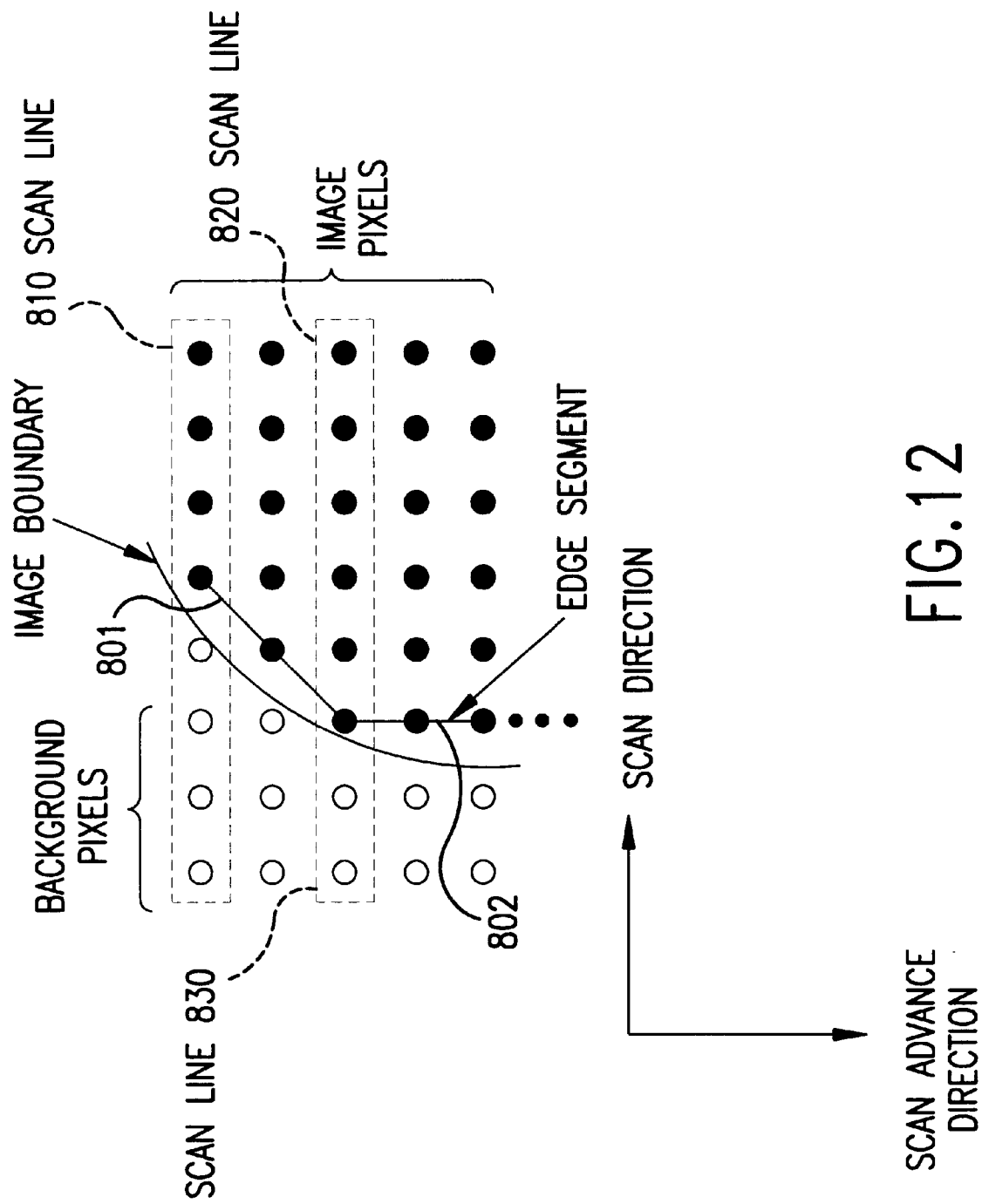

FIGS. 9A and 9B show the process of the skew detection and image cropping program 202 (FIGS. 3 and 4) in developing the edge segments and the six boundary pixels of the document image. FIG. 10 shows the process of the program 202 of FIGS. 3 and 4 in detecting the skew angle of the document image based on the edge segments developed by the process of FIGS. 9A and 9B. FIG. 11 shows how edge segments are developed in a rectangular document image. FIG. 12 shows how edge segments are developed in a circular or oval document image. FIGS. 9A–10 will be described in more detail below, also in connection with FIGS. 11 and 12.

As can be seen from FIGS. 9A and 9B, the process starts at step 500. At steps 501 and 502, the color values of a scan line of background pixels are set. The values are set as the reference values for comparing with the colors of the pixels of each scan line of the scan image to locate the first and last image pixels (i.e., edge pixels) of each scan line. In another embodiment, only the luminance valve of each pixel is used, where luminance is computed as approximately one-fourth red, one-half green, and one-eighth blue. In one embodiment, a pixel is regarded as an image pixel when its color (or luminance) is different from the color (or luminance) of the corresponding reference background pixel by more than a predetermined threshold value. The term color will be used hereinafter interchangeably to mean color and/or luminance. The threshold value is a constant that is determined based on the expected variability of the scanner background. In another embodiment, a pixel of a scan line is regarded as an image pixel when its color is different from the color of the corresponding reference background pixel by more than the predetermined threshold value and the color of its adjacent pixel is also different from the color of the corresponding reference background pixel by more than the predetermined threshold value. The second embodiment is more robust in the presence of scanner noise.

At step 503, it is determined if all of the scan lines of the scan image have been processed. If so, steps 504–506 are performed to calculate the skew angle of the document image inside the scan image. As can be seen from FIG. 9A, step 505 is employed to determine if the document image is of non-rectangular shape. The program 202 (FIGS. 3 and 4) does this at step 505 by determining if different skew angles are found for the edge segments of the document image. If so, the program 202 does not calculate the skew angle of the document image. Instead, the skew angle is set to zero in step 507a. If, at step 505, it is determined that these are not multiple skew angles, then step 506 is performed to calculate the skew angle of the document image. In either case, the program 202 fishes by computing the cropping boundaries in step 507 and ending at step 523.

When, at step 503, it is determined that the scan image has not been completely checked, step 508 is then performed to obtain the next unchecked scan line of pixels (e.g., scan line r). Then the color of each of the pixels of the scan line r is compared with the color of each of the background pixels of the background scan line at step 509 to determine if they match. If so, (i.e., the scan line r also only contains nothing but the background pixels), then the program 202 returns to step 503 via step 510. If not, step 511 is performed, at which the first document image pixel (i.e., pixel c1) having a color different from that of the corresponding background pixel is located. The value r is initially set at zero and incremented every time a scan line is checked.

Then the process moves to step 512, at which the boundary pixel storage is updated. This is done by comparing the current first and last pixels with the stored six boundary pixels to determine if these six pixels need to be updated. The positioned values of these six pixels are initially set at zero. If, for example, the positional value of the current first pixel is less than that of the stored leftmost pixel, then the stored leftmost pixel is replaced with the current first pixel. This allows the six boundary pixels of the document image to be finally determined.

Then step 513 is performed, at which it is determined if the first document image pixel of the scan line r continues a left edge segment. If so, step 514 is performed to continue the edge segment. For example, as can be seen from FIG. 11, if the scan line 700 is currently checked and scan line r and the pixel 710 is determined to be the first pixel of the scan line, the step 513 of FIG. 9B determines if the pixel 710 continues the edge segment 701 and the step 714 causes the edge segment 701 to extend to the pixel 710. Similarly, FIG. 12 shows the development of the edge segments 801 and 802 of a circular or oval document image.

As can be seen from FIG. 9B, when the answer is no at step 513, step 515 is then performed to end that left edge segment. Step 516 is then performed to start a new left edge segment from this first pixel. Then steps 517 through 522 are performed to locate the last pixel of the scan line r. As can be seen from FIGS. 9A–9B, steps 517–522 are basically the same steps as steps 511–516, except that steps 517–522 are employed to locate and process the last pixel of the scan line while steps 511–516 are employed to locate and process the first pixel of the scan line.

FIG. 10 shows the process of updating the skew information based on a detected edge segment. This process is undertaken when a segment is ended, as in steps 504, 510, 515, and 521 of FIGS. 9A and 9B. Whenever the segment is too short, it is discarded in step 602. If the document image is determined to have a non-rectangular shape in step 604, the skew angle is set to zero, and subsequent segments are discarded. Otherwise, the slope of the detected segment is used to update the skew angle estimate.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A method of determining a skew angle of a document image inside a scan image having a plurality of scan lines of pixels, comprising the steps of:

(A) receiving a scan line of pixels of the scan image;

(B) automatically detecting an edge segment of the document image by detecting a first/last document image pixel of the scan line of pixels that belongs to the document image without dividing the scan line into a number of multiple-pixel blocks and without any user intervention and input;

(C) if the first/last document image pixel of the scan line continues the edge segment having the first/last document image pixel of previous scan lines of the scan image, then automatically extending the edge segment to the first/last document image pixel of the scan line;

(D) repeating the steps of (A) and (B) until the edge segment cannot be further extended without any user intervention and without requiring that the document image contains text, wherein the edge segment forms an edge of the document image;

(E) determining if the edge segment is longer than a predetermined length value;

(F) determining the skew angle by determining a slope of the edge segment if the edge segment is longer than the predetermined length value.

2. The method of claim 1, wherein the scan image includes document image pixels of the document image and background pixels of the scan image, wherein the step (B) further comprises the steps of:
   (I) receiving a corresponding scan line of predetermined background pixels;
   (II) comparing the scan line of pixels of the scan image with the corresponding scan line of predetermined background pixels to locate the first/last document image pixel of the scan line of pixels that belongs to the document image.

3. The method of claim 2, wherein the step (II) further comprises the steps of:
   (i) comparing color of the first/last document image pixel with color of its corresponding background pixel;
   (ii) comparing color of an adjacent pixel of the first/last document image pixel with color of its corresponding background pixel;
   (iii) determining that the first/last document image pixel is indeed the first/last document image pixel of the document image along the scan line if the color of the first/last document image pixel is different from that of its corresponding background pixel and the color of the adjacent pixel is different from that of its corresponding background pixel.

4. The method of claim 3, wherein the color of each of the background pixels is approximately one-fourth red, one-half green, and one-eighth blue.

5. The method of claim 1, wherein the step (C) further comprises the steps of:
   (I) if the first/last document image pixel of the scan line does not continue the edge segment, then ending the edge segment and generating a new edge segment that extends to the first/last document image pixel of the scan line;
   (II) repeating the steps (A) and (B).

6. The method of claim 5, wherein the step (F) further comprises the steps of:
   (a) determining if the document image has a rectangular shape by determining (1) if the edge segment is perpendicular or parallel to previous edge segments and (2) if the edge segment is longer than the predetermined length value;
   (b) setting the skew angle to zero if the document image does not have the rectangular shape.

7. The method of claim 6, wherein the predetermined length value is approximately equal to twenty five pixels.

8. The method of claim 1, further comprising the step of determining boundary the document by
   (A) checking each of the scan lines against a predetermined scan line of background pixels to locate
      (1) a first document image pixel and a last document image pixel for a first scan line of the scan lines,
      (2) a first document image pixel and a last document image pixel of a last scan line of the scan lines,
      (3) a leftmost document image pixel of the document image, and
      (4) a rightmost document image pixel of the document image;
   (B) connecting the first and last document image pixels of the first and last scan lines, the leftmost document image pixel, and the rightmost document image pixel together to define the boundary of the document image.

9. The method of claim 8, further comprising the step of determining if the document image has multiple skew angles.

10. The method of claim 9, further comprising the step of extending (1) a first horizontal line through the first and last document image pixels of the first scan line, (2) a second horizontal line through the first and last document image pixels of the last scan line, (3) a first vertical line through the leftmost document image pixel, and (4) a second vertical line through the rightmost document image pixel to define the boundary of the document image if the document image has multiple skew angles.

11. An apparatus, comprising:
   (A) a storage medium;
   (B) a computer executable program stored on the storage medium, the computer executable program, when executed, determining a skew angle of a document image inside a scan image having a plurality of scan lines of pixels, wherein the computer executable program comprises
      (I) a first set of instructions that receive and examine a scan line of pixels of the scan image;
      (II) a second set of instructions that detect an edge segment of the document image by
         detecting a first/last document image pixel of the scan line of pixels that belongs to the document image without dividing the scan line into a number of multiple-pixel blocks and without any user intervention and input;
         and extending the edge segment having the first/last document image pixel of previous scan lines of the scan image to the first/last document image pixel of the scan line; wherein the first and second sets of instructions are repeatedly executed until the edge segment cannot be further extended without any user intervention and without requiring that the document image contains text if the first/last document image pixel of the scan line continues the edge segment;
      (III) a third set of instructions that determine if the edge segment is longer than a predetermined length value;
      (IV) a fourth set of instructions that determine the skew angle by determining a slope of the edge segment if the edge segment is longer than the predetermined length value.

12. The apparatus of claim 11, wherein the scan image includes image pixels of the document image and background pixels of the scan image, wherein the second set of instructions further comprises
   (a) a first subset of the second set of instructions that receive a corresponding scan line of predetermined background pixels;
   (b) a second subset of the second set of instructions that compare color of the first/last document image pixel with color of its corresponding background pixel;
   (c) a third subset of the second set of instructions that compare color of an adjacent pixel of the first/last document image pixel with color of its corresponding background pixel;
   (d) a fourth subset of the second set of instructions that decide that the first/last document image pixel is indeed the first/last document image pixel of the document image along the scan line if the color of the first/last document image pixel is different from that of its corresponding background pixel and the color of the adjacent pixel is different from that of its corresponding background pixel.

13. The apparatus of claim 12, wherein the color of each of the background pixels is approximately one-half green, one-fourth red, and one-eighth blue.

14. The apparatus of claim 13, wherein the second set of instructions further comprise a fifth subset of instructions that end the edge segment and generate a new edge segment that extends to the first/last document image pixel of the scan line if the first/last document image pixel of the scan line does not continue the edge segment.

15. The apparatus of claim 14, further comprising
   (a) a first subset of the fourth set of instructions that determine if the document image has a rectangular shape by determining (1) if the edge segment is perpendicular or parallel to previous edge segments and (2) if the edge segment is longer than a predetermined length value;
   (b) a second subset of the fourth set of instructions that set the skew angle to zero if the document image is not substantially in the rectangular shape.

16. The apparatus of claim 15, wherein the predetermined length value is approximately equal to twenty five pixels.

17. The apparatus of claim 11, further comprises a fifth set of instructions that determine boundary of the document image by
   (I) checking each of the scan lines against a predetermined scan line of background pixels to locate
      (1) a first document image pixel and a last document image pixel for a first scan line of the scan lines,
      (2) a first document image pixel and a last document image pixel for a last scan line of the scan lines,
      (3) a leftmost document image pixel of the document image, and
      (4) a rightmost document image pixel of the document image;
   (II) connecting the first and last document image pixels of the first and last scan lines, the leftmost document image pixel, and the rightmost document image pixel together to define the boundary of the document image.

18. The apparatus of claim 17, further comprising a sixth set of instructions that determine if the document image has multiple skew angles.

19. The apparatus of claim 18, further comprising a seventh set of instructions that extend (1) a first horizontal line through the first and last document image pixels of the first scan line, (2) a second horizontal line through the first and last document image pixels of the last scan line, (3) a first vertical line through the leftmost document image pixel, and (4) a second vertical line through the rightmost document image pixel to define the boundary of the document image if the document image has multiple skew angles.

* * * * *